INVENTOR.
Robert B. Cottrell

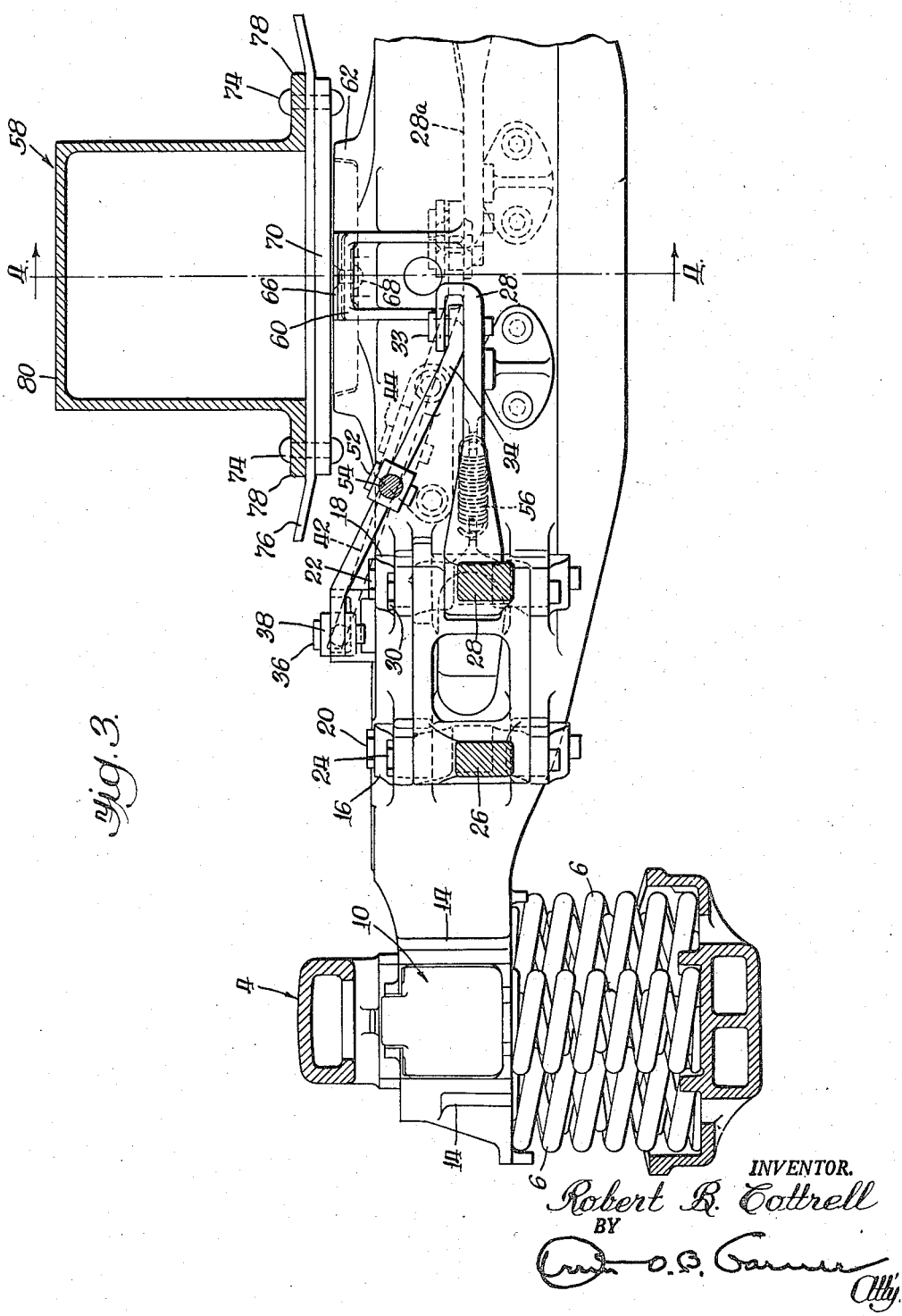

2,877,721

BOLSTER STABILIZER

Robert B. Cottrell, Chicago, Ill., assignor to American Steel Foundries, Chicago, Ill., a corporation of New Jersey Application May 28, 1953, Serial No. 357,976

1 Claim. (Cl. 105—200)

This invention relates to railway freight cars and more particularly to an arrangement for limiting relative tipping or rotative movement between a truck bolster and the car body supported by the center bearing of said bolster when the car is subjected to longitudinal impacts or when the truck bolster is subjected to braking torque.

It has been discovered that impacts on the car, as for example during coupling, sometimes causes the car body to bounce thereby relieving the weight of the car body from the center bearing of the truck bolster at the same time that the bolster tends to rotate on an axis extending transversely of the car and longitudinally of the bolster. This condition not only causes disturbance of the springs which support the truck bolster in arrangements where the bolster is spring-supported at its ends from side frames, but also damages friction devices in arrangements where such devices are utilized to snub movements of the truck bolster and its supporting springs. In cases of severe impacts, the king pin connection between the car body and the center bearing of the truck bolster has been released.

It has also been discovered that in certain types of freight car brakes which are mounted on the truck bolster, braking torque tends to rotate the bolster causing disturbances similar to those above described.

Accordingly, a primary object of the present invention is to devise means for limiting such relative rotative movement between the truck bolster and the supported car body.

A more specific object of the invention is to provide wings or lugs projecting laterally from the bolster and cooperating with abutments on the car body to limit such rotative movement of the bolster.

Still another object of the invention is to provide a truck bolster having wings or projections on its center bearing underlying abutments on the center sill of the car body.

The foregoing and other objects and advantages of the invention will become apparent from a consideration of the following specification and the accompanying drawings, wherein:

Figure 3 is an end view taken from the right of Figure 1, with the truck side frame, the brake levers and the car body center sill shown in vertical section.

Figure 1:
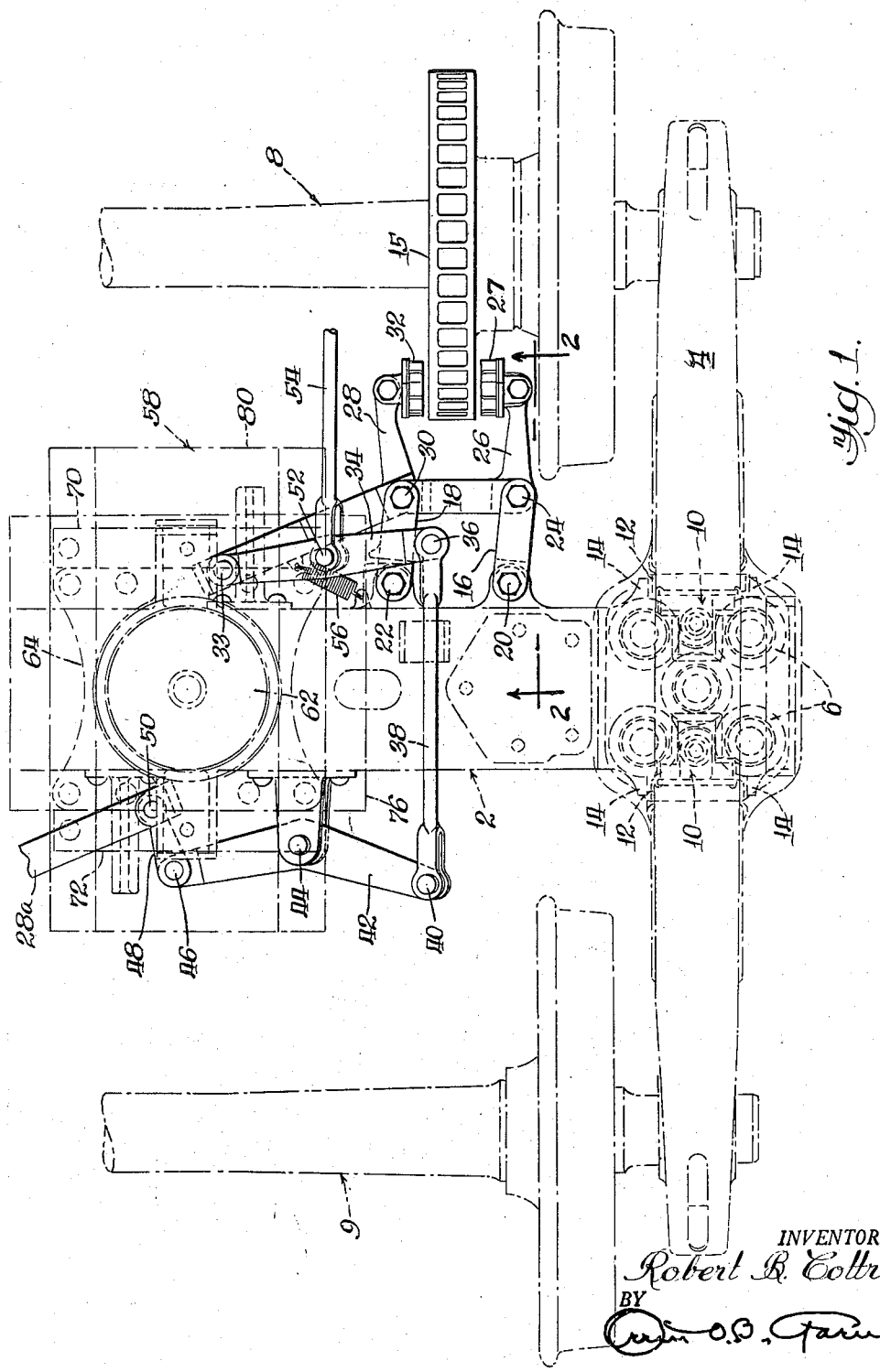
Figure 1 is a fragmentary top plan view of a railway freight car embodying the invention, the car body parts being shown in phantom lines.
Figure 2:
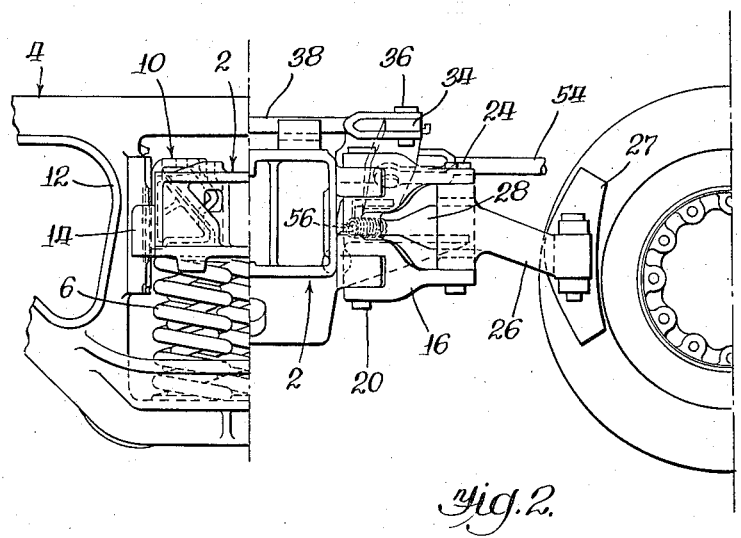
Figure 2 is a fragmentary side view of the structure shown in Figure 1, the left half of Figure 2 being a side elevational view and the right half thereof being a vertical sectional view, approximately on the line 2—2 of Figure 1.

Describing the invention in detail, the truck comprises a bolster 2 supported by a conventional side frame 4 at each end of the bolster, only one of the side frames being illustrated in the drawings, inasmuch as they are usually identical. In the illustrated embodiment, the bolster 2 is supported from the frame 4 by a plurality of springs 6 although, if desired, the bolster may be non-resiliently supported by the frame 4 which may be yieldingly supported in well known manner by wheel and axle assemblies 8 and 9.

The bolster 2 is preferably provided with friction devices 10 at each end thereof to develop friction against columns 12 of each side frame 4. These devices are preferably of the type disclosed by U. S. Patent No. 2,378,414, and for this reason are not described in detail in the present application.

As best seen in Figure 1, each end of the bolster is preferably provided with inboard and outboard gibs 14 confining the columns 12 to accommodate vertical movement of the bolster 2 as well as limited movement thereof laterally of the truck.

The truck is preferably provided with brake means mounted on the bolster 2 for cooperation with a disk or rotor 15 of each wheel and axle assembly 8 and 9, although if desired one disk 15 and associated brake means may be used.

In the illustrated embodiment, the brake means associated with each disk 15 are characterized by outboard and inboard links 16 and 18 pivoted to the bolster as at 20 and 22, respectively. The link 16 is pivoted at 24 to a bell crank lever 26 carrying a friction shoe 27 for engagement with one side of the related disk 15 upon actuation of the brake means. The lever 26 is also pivoted to the link 18 and to another bell crank lever 28 as at 30, said lever 28 supporting a brake shoe 32 for engagement with the opposite side of the disk 15.

The lever 28 is pivoted as at 33 to a live truck lever 34, the outboard end of which is pivoted as at 36 to a pull rod 38, which is also pivoted as at 40 to the outboard end of a dead truck lever 42. The dead truck lever 42 is pivotally fulcrummed as at 44 to the bolster 2 and is pivotally connected at 46 to a link or clevis 48 which is pivotally connected as at 50 to a bell crank lever 28a corresponding to the before mentioned lever 28 and operatively connected to identical brake means (not shown) associated with a brake rotor 15 (not shown) on the wheel and axle assembly 9.

The live truck lever 34 is pivoted as at 52 to an actuator pull rod 54 which may be connected to any suitable operating means, such as a compressed air piston and cylinder device (not shown) as is commonly used in the art. A brake release tension spring 56 is pivotally connected to the bell crank lever 28 and to the bolster 2 for the purpose of releasing the brake means associated with the disk 15 when braking tension has been relieved from the actuator pull rod 54.

Figure 4:
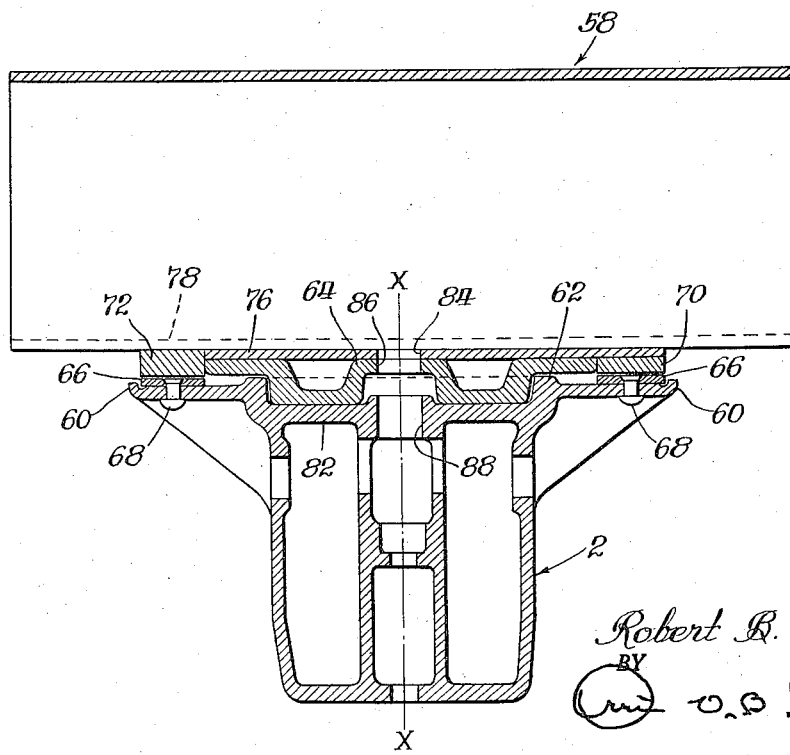
Figure 4 is a sectional view on the line 4—4 of Figure 3.

As will be readily understood by those skilled in the art, during braking engagement of the shoes 27 and 32 with the disk 15, braking torque is transmitted to the bolster 2 tending to rotate the latter on an axis extending longitudinally of the bolster 2, that is transversely of the railway car; and according to the invention, means are provided for transmitting such torque to the car body, which is fragmentarily illustrated at 58 in Figures 1, 3 and 4.

I have provided for this purpose a pair of wings or lugs 60 projecting laterally from opposite sides of the bolster, preferably at its center bearing 62 upon which the conventional center plate 64 of the car body is supported in the usual manner. A plate 66 of any suitable material, such as steel, hard rubber, or plastic, is secured as by a rivet 68 to each wing 60, and these plates 66 are preferably spaced slightly from torque ribs or bars 70 and 72 affording abutment for the plates 66 under the conditions hereinafter described. The bar 70 is secured as by rivets 74 to a center sill member 76 and to flanges 78 of a car body center sill 80; and the bar 72 is similarly secured to the flanges 78. For this reason, as best seen in Figure 4, the bar 72 is somewhat thicker than the bar 70 in order to maintain approximately the same spacing between the bars 70 and 72 and the underlying plates 66.

The center sill member 76, the car body center bearing plate 64, and a top web or wall 82 of the truck bolster 2 are provided with king pin openings 84, 86 and 88, respectively, for reception of a conventional king pin (not shown) as is commonly utilized to maintain pivotal connection between the car body 58 and the truck bolster 2 accommodating pivotal or rotary motion therebetween, approximately on a vertical axis indicated by the line X—X of Figure 4.

As will be best understood by a consideration of Figures 1 and 4, upon actuation of the brake shoes 28 and 32, they are engaged with opposite sides of the disk 15 which rotates with the related wheel and axle assembly whereupon braking torque is transmitted to the bolster 2 tending to rotate the latter on an axis extending longitudinally of the bolster 2 and transversely of the car body 58. Under such conditions, one of the plates 66 depending upon the direction which the car is traveling is engaged with the related bar 70 or 72 of the car body thereby transmitting braking torque from the truck bolster 2 to the car body 58 and substantially limiting such rotation of the truck bolster to the slight clearance which is preferably maintained between the plates 66 and the overlying ribs 70 and 72 of the car body. This novel arrangement, by preventing substantial rotation of the truck bolster 2, not only prevents disturbance of the bolster supporting springs 6 and the friction devices 10 but also avoids undesirable wear on the various connections between the component parts of the brake system heretofore described.

It should be presently noted that the braking torque may be transmitted through the torque connection extending from bolster pivots 20 and 22 along outboard link 16 and inboard link 18, respectively, to the pivotal connections between levers 26 and 28, respectively, and the related brake shoes. The braking torque may act through a distance equal to the linear distance between the longitudinal vertical center plane of the bolster and the pivotal connections between levers 26 and 28 and their related brake shoes. The stabilizing effect or torque may act upon the bolster to counteract the braking torque and which may act through a distance equal to the linear distance between the longitudinal vertical center plane of the bolster and the end of one of the plates 66 remote from said plane. The braking torque depends upon the effective distance through which it acts. The stabilizing torque depends upon the effective distance through which it acts. As a practical matter, therefore, and as readily seen in Figure 1, the stabilizing torque acts through a distance which may be approximately at least one half the distance through which the braking torque acts.

It may also be noted that when the brake system is released or when some other braking system is utilized which transmits braking torque to the side frames 4, as is well known in the art, the plates 66 are engageable with the bars 70 and 72, respectively, to limit and substantially prevent similar rotation of the truck bolster 2 as may be caused by impacts longitudinally of the car body during coupling or buffing, as heretofore discussed.

I claim:

In a railway freight car, the combination of a side frame, a bolster spring-supported from said frame and comprising a center bearing, a car body having a sill member extending lengthwise thereof on the underside thereof, said sill member being perpendicular to said bolster and being slidably supported by said bearing for rotational movement relative thereto on a substantially vertical axis, and means for substantially preventing rotational movement of the bolster about an axis extending longitudinally thereof, said means comprising wings extending from said bolster in a direction perpendicular thereto and parallel to said sill member, and cross bars at the ends of said wings, said cross bars being secured to said sill member, said cross bars extending in a direction parallel to said bolster and perpendicular to said wings and said sill member so as to interengage said wings and said sill member.

References Cited in the file of this patent
UNITED STATES PATENTS

| | | |
|---|---|---|
| 1,276,188 | Dietz | Aug. 20, 1918 |
| 2,620,743 | Taylor | Dec. 9, 1952 |